United States Patent
Harada et al.

(10) Patent No.: US 7,623,294 B2
(45) Date of Patent: Nov. 24, 2009

(54) HEAD-UP DISPLAY APPARATUS

(75) Inventors: Takeshi Harada, Shizuoka (JP);
Yoshiyuki Furuya, Shizuoka (JP);
Hideaki Kageyama, Shizuoka (JP)

(73) Assignee: Yazaki Corporation, Tokyo (JP)

( * ) Notice: Subject to any disclaimer, the term of this patent is extended or adjusted under 35 U.S.C. 154(b) by 516 days.

(21) Appl. No.: 11/242,793

(22) Filed: Oct. 5, 2005

(65) Prior Publication Data
US 2006/0077497 A1    Apr. 13, 2006

(30) Foreign Application Priority Data
Oct. 5, 2004    (JP)    .............. 2004-292376

(51) Int. Cl.
*G02B 27/14*    (2006.01)
(52) U.S. Cl. .................. 359/630; 359/13; 359/632
(58) Field of Classification Search .......... 359/13, 359/630, 632
See application file for complete search history.

(56) References Cited
U.S. PATENT DOCUMENTS

| | | | |
|---|---|---|---|
| 5,028,119 A * | 7/1991 | Hegg et al. ............ | 359/632 |
| 5,237,455 A * | 8/1993 | Bordo et al. ............ | 359/632 |
| 6,049,288 A * | 4/2000 | Kawasaki .............. | 340/815.4 |
| 6,542,305 B2 * | 4/2003 | Nakamura et al. ...... | 359/630 |

FOREIGN PATENT DOCUMENTS

JP    9-315182    12/1997

* cited by examiner

*Primary Examiner*—Jessica T Stultz
*Assistant Examiner*—Mahidere S Sahle
(74) *Attorney, Agent, or Firm*—Kratz, Quintos & Hanson, LLP

(57) ABSTRACT

A head-up display apparatus includes a display unit outputting display light, a mirror for reflecting the display light toward an eye point, a mirror holder to be turned up/down for receiving and holding the mirror, a holder top cover extending toward the eye point when the mirror holder is turned up, and a holder rear cover so as to be placed at an opposite side of the eye point when the mirror holder is turned up. The holder rear cover has a surface shape to become in the same outline as that of the instrument panel when the holder rear cover covers totally an opening provided at the instrument panel in case that the mirror holder is turned down. The holder rear cover is continued to the holder top cover with an acute angle.

3 Claims, 5 Drawing Sheets

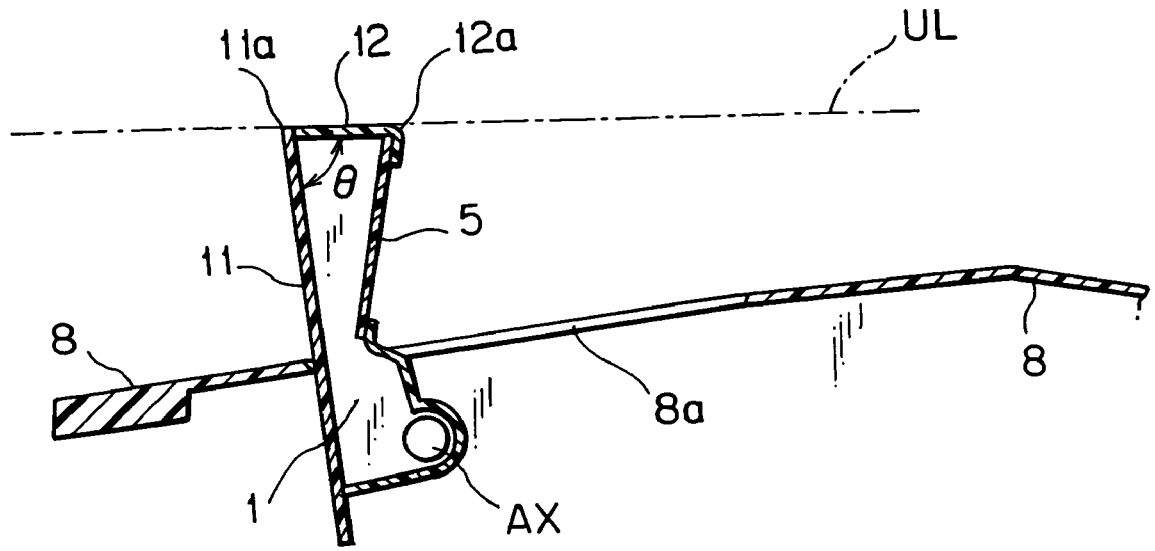
F I G. 4 A
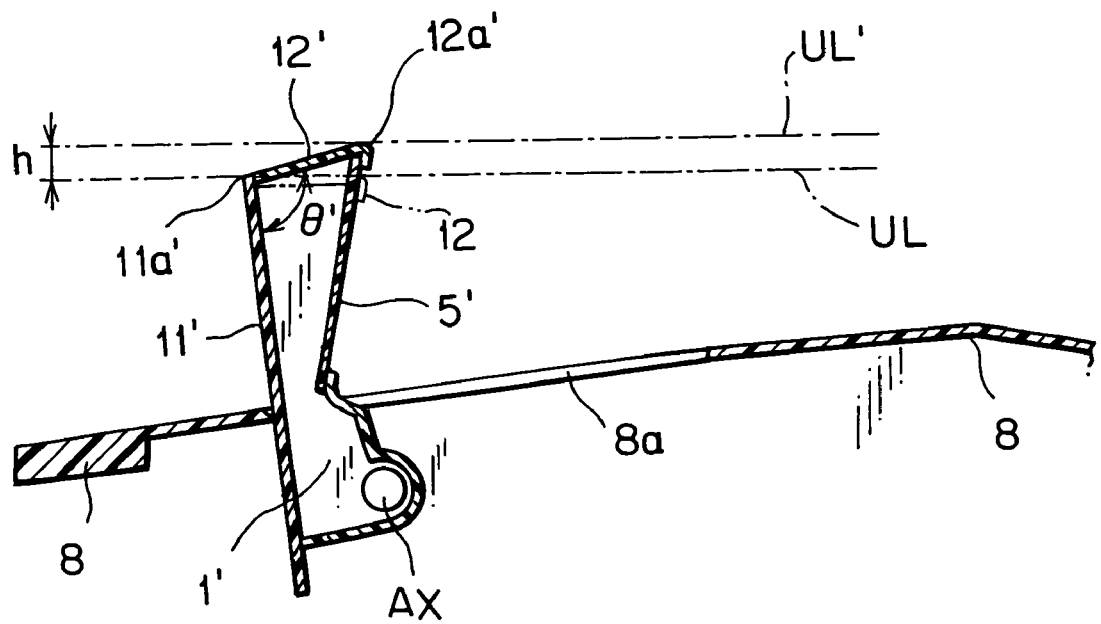
F I G. 4 B

HEAD-UP DISPLAY APPARATUS

The priority application Number Japan Patent Application 2004-292376 upon which this patent application is based is hereby incorporated by reference.

BACKGROUND OF THE INVENTION

1. Field of the Invention

This invention relates to a head-up display apparatus installed at a vehicle, especially to the head-up display including a mirror holder to be turned up/down.

2. Description of the Related Art

The patent reference 1 shows such kind of a usual head-up display apparatus. The usual head-up display apparatus will be described with reference to FIGS. 5, 6. FIG. 5A shows a condition that the usual head-up display apparatus is turned down forwardly. FIG. 5B shows a condition that the usual head-up display apparatus is turned up. FIG. 6 is a plan view of the head-up display apparatus to be turned down forwardly shown in FIG. 5.

The usual head-up display apparatus includes a display unit 92 received in a box-shape housing 91 for outputting a predetermined display light, a mirror 93, a front side cover 94 forming a front side wall of the housing 91 and acting open/close around an axis at one part of the housing 91, a mirror 96 to be turned up/down around an axis at the other part of the housing 91 as shown in FIGS. 5A, 5B. The front side cover 94 has a rotation shaft 941 and a rotation guide pin 942. The mirror 96 is provided with a hinge 97 for making the mirror 96 capable to act open/close. The hinge 97 has a rotation shaft 971 and a rotation guide pin 972. The front side cover 94 and the mirror 96 act open/close interlockingly around the rotation shaft 941 and the rotation shaft 971 by forces supplied on the pin 942 and pin 972.

According to such structure, in a condition that the mirror 96 is turned down forwardly, the front side cover 94 is closed as shown in FIG. 5A. On the other hand, in a condition that the mirror 96 is turned up, the front side cover 94 is opened interlockingly with the mirror 96 as shown in FIG. 5B.

In FIG. 5B, the mirror 96 changes light path of a display light L outputted from the display unit 92 and reflected by a mirror 93, and provides final display information to an eye point E predetermined for a driver sitting on a driver seat. Usually, there is a plurality of eye points in a range between an upper limit and a lower limit. Therefore, the eye point can be called an eye range.

The patent reference 1 related with the present invention is: Japan Patent Application Laid Open No. H9-315182.

SUMMARY OF THE INVENTION

Objects to be Solved

In a vehicle, for maintaining a front view for safety of drive, an upper limited line is predetermined based on the upper limit of the eye point. An upper end of the head-up display apparatus must be designed not to over the upper limited line. For the reason, according to the usual example, the mirror 96 to be the upper limited line of the head-up display apparatus is designed miniaturized. Therefore, the mirror 96 and the front side cover 94 are separated.

According to the usual example, the mirror 96 and the front side cover 94 are separated. Thereby, when turning the mirror 96 down forwardly, many parting lines G" and the hinge 97 are exposed as shown in FIG. 6, so that looking thereof becomes bad. By miniaturizing the mirror 96, visual recognizability thereof is made lower.

To overcome the above problem, an object of the present invention is to provide a head-up display apparatus, which can be improved about an appearance thereof by making it difficult to see a parting line. Another object of the present invention is to provide a head-up display apparatus, which can be improved about its appearance and simultaneously maintain better visual recognizability.

How to Attain the Object of the Present Invention

In order to attain the object of the present invention, a head-up display apparatus according to an aspect of the present invention, includes a display unit, to be installed in an instrument panel of a vehicle, outputting predetermined display light; a mirror for reflecting the display light toward a predetermined eye point; a mirror holder to be turned up/down, being mounted through a shaft on the instrument panel for receiving and holding the mirror; a holder top cover at a top portion of the mirror holder, extending toward the eye point when the mirror holder is turned up; and a holder rear cover at a rear portion of the mirror holder, being continued to the holder top cover so as to be placed at an opposite side of the eye point when the mirror holder is turned up. It is characterised in that the holder rear cover has a surface shape to become in a same outline as that of the instrument panel when the holder rear cover covers totally an opening provided at the instrument panel in case that the mirror holder is turned down forwardly, and the holder rear cover is continued to the holder top cover with an acute angle.

According to the above invention, the holder rear cover has a surface shape to become in the same outline as that of the instrument panel when the holder rear cover covers wholly an opening provided at the instrument panel in case that the mirror holder turns down forwardly and the holder rear cover is continued to the holder top cover with an acute angle. Thus, the holder rear cover covers totally the openings, so that number of the parting lines can be reduced. Since the holder rear cover has the surface shape to become in the same outline as that of the instrument panel when the holder rear cover covers totally an opening provided at the instrument panel in case that the mirror holder is turned down forwardly and the holder rear cover is continued to the holder top cover with the acute angle, the holder rear cover can cover the holder top cover when the mirror holder is turned down forwardly. It can make a width of the parting line narrower.

In order to attain the object of the present invention, a head-up display apparatus according to another aspect of the present invention, is characterized in the head-up display apparatus as claimed in the present invention in that the holder rear cover is made of the same material and the same color as that of the instrument panel.

According to the above invention, the holder rear cover is made of the same material and the same color as that of the instrument panel, so that an appearance thereof can be improved.

In order to attain the object of the present invention, a head-up display apparatus according to a further aspect of the present invention, is characterized in the head-up display apparatus as claimed in the present invention in that the mirror holder is turned up so as to overlap the holder top cover on an upper limited line predetermined base on an upper position of the eye point.

According to the above invention, since the mirror holder is turned up so as to overlap the holder top cover on the upper limited line predetermined base on the upper position of the eye point, within the limitation of the upper limited line, the appearance can be improved and simultaneously a larger size mirror can be used.

EFFECTS OF THE INVENTION

According to the above invention, the holder rear cover has a surface shape to become in the same outline as that of the instrument panel when the holder rear cover covers totally an opening provided at the instrument panel in case that the mirror holder is turned down forwardly and the holder rear cover is continued to the holder top cover with an acute angle. Thus, the holder rear cover covers totally the openings, so that number of the parting lines can be reduced. Since the holder rear cover has the surface shape to become in the same outline as that of the instrument panel when the holder rear cover covers totally an opening provided at the instrument panel in case that the mirror holder is turned down forwardly and the holder rear cover is continued to the holder top cover with the acute angle, the holder rear cover can cover the holder top cover when the mirror holder is turned down forwardly. It can make a width of the parting line narrower. Therefore, the number of the parting lines can be reduced and also the width of the parting lines can be made narrower, so that it makes difficult to see the parting lines and the appearance can be improved.

According to the above invention, the holder rear cover is made of the same material and the same color as that of the instrument panel, so that the appearance thereof can be more improved.

According to the above invention, since the mirror holder is turned up so as to overlap the holder top cover on the upper limited line predetermined base on the upper position of the eye point, within the limitation of the upper limited line, the appearance can be improved and simultaneously a larger size mirror can be used. Therefore, the appearance can be improved and also better visual recognizability can be maintained.

The above and other objects and features of this invention will become more apparent from the following description taken in conjunction with the accompanying drawings.

BRIEF DESCRIPTION OF THE DRAWINGS

FIG. 4A is an illustration showing a condition that the head-up display apparatus is turned up;

FIG. 4B is an illustration for explaining a condition that the head-up display apparatus is turned up;

DESCRIPTION OF THE PREFERRED EMBODIMENT

Figure 1A:
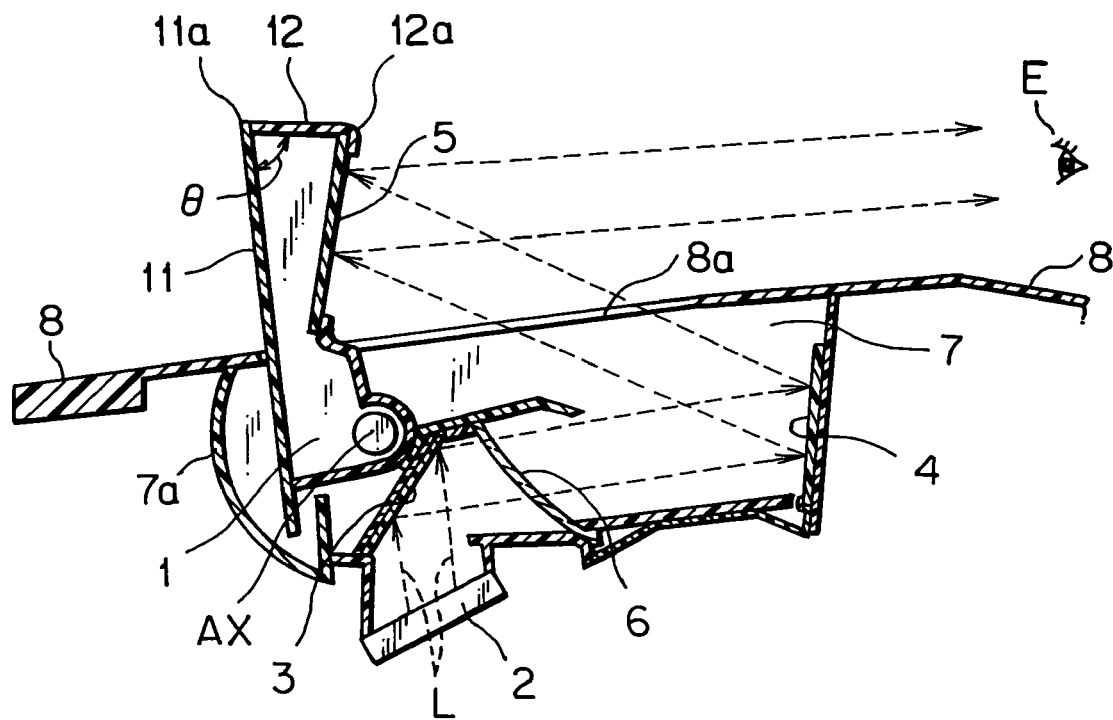
FIG. 1A is an illustration showing a condition that a head-up display apparatus of one embodiment according to the present invention is turned up.
Figure 1B:
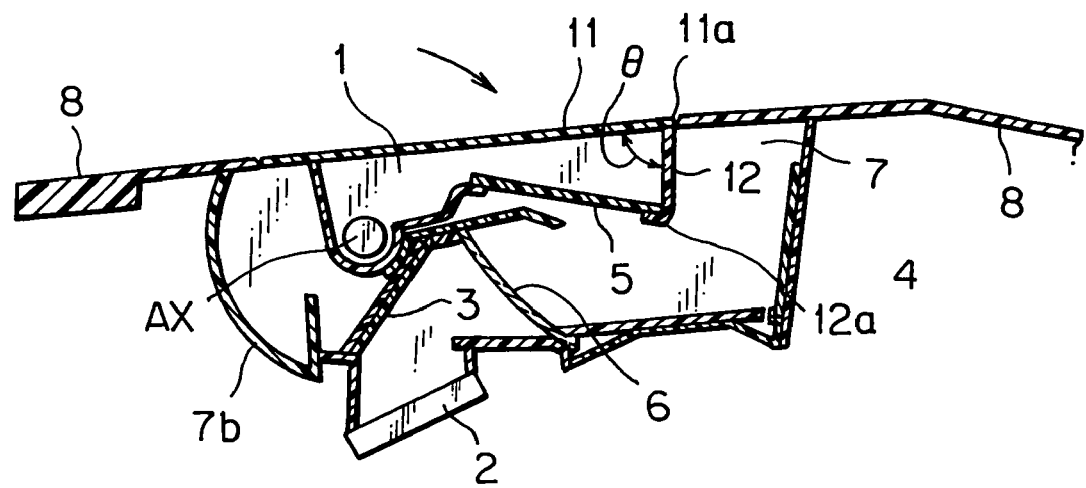
FIG. 1B is an illustration showing a condition that the head-up display apparatus is turned down forwardly.
Figure 2:
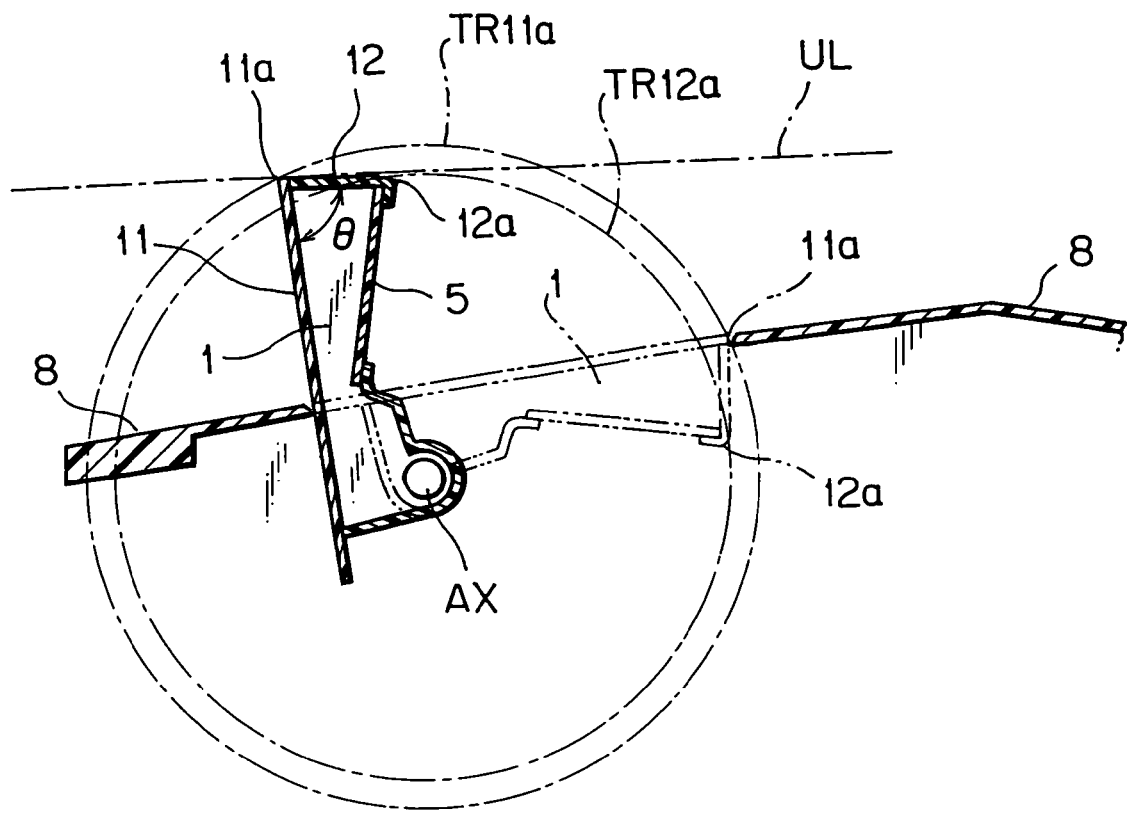
FIG. 2 is an illustration for explaining actions of the head-up display apparatus turning up/down.
Figure 6:
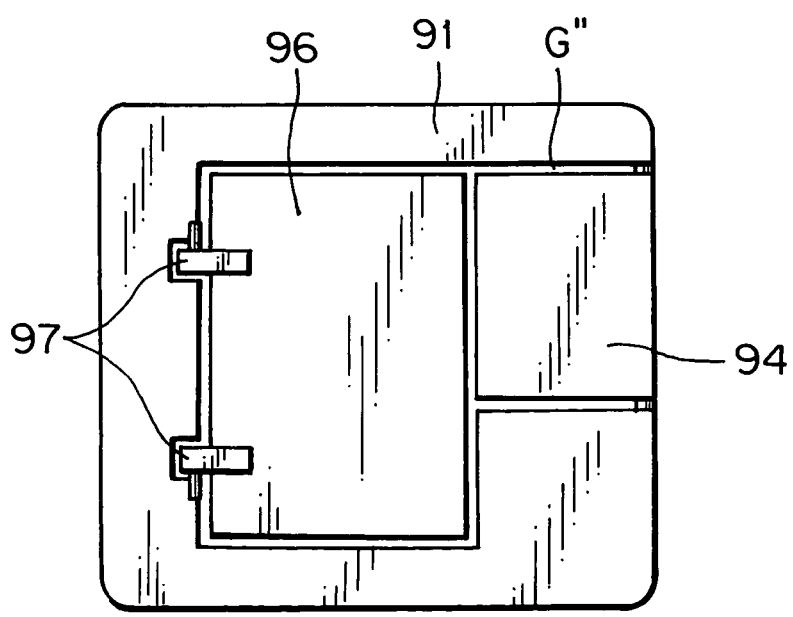
FIG. 6 is a plan view of the head-up display apparatus in a condition that the head-up display apparatus shown in FIG. 5 is turned down.

An embodiment according to the present invention will be described with reference to figures. FIG. 1A shows a head-up display apparatus of the embodiment according to the present invention in a condition of turning up, and FIG. 1B shows the head up display apparatus in a condition of turning down forwardly. FIG. 2 is an illustration for explaining actions of turning up and down of the head-up display apparatus of the embodiment according to the present invention. FIGS. 1, 2 are side sectional views.

As shown in FIGS. 1A, 1B, the head-up display apparatus is installed at an instrument panel 8 of a front area in a room of a vehicle. The head-up display apparatus includes a mirror holder 1, a display unit 2, a plurality of mirrors 3, 4, 5, a front glass 6 and a receiving section 7.

The mirror holder 1 is made of a black color resin, and receives and holds the mirror 3, which is the closest mirror to an eye point E among the plurality of mirrors 3, 4, 5. The mirror holder 1 is mounted with a shaft on the instrument panel 8 so as to be rotatable within a predetermined angle range around a rotation shaft AX. The mirror holder 1 can be turned up/down between a condition of turning up shown in FIG. 1A and a condition of turning down forwardly shown in FIG. 1B.

The mirror holder 1 includes a holder rear cover 11 at a rear portion of the mirror holder 1, and a holder top cover 12 at a top portion of the mirror holder 1. The holder rear cover 11 and the holder top cover 12 are connected with each other to form L-shape section with an acute angle.

The holder rear cover 11 has a surface shape, which is the same shape as an opening 8a formed at the instrument panel 8, to become in a same outline as that of the instrument panel when the holder rear cover covers totally an opening provided at the instrument panel in case that the mirror holder 1 is turned down forwardly. The holder rear cover 11 is positioned at a opposite side against the eye point E when the mirror holder 1 is turned up. The holder rear cover 11 is preferably made of the same material and the same color as that of the instrument panel for improving an appearance thereof when the mirror holder 1 is turned down forwardly.

The holder top cover 12 extends toward the eye point E side when the mirror holder 1 is turned up. The holder top cover 12 holds a part of the mirror 5 for maintaining a setting angle of the mirror 5. The holding top cover 12 is formed into a long strip rectangle by viewing from top. The holder top cover 12 is preferably made of the same material and the same color as that of the holder rear cover 11.

The display unit 2 is mounted on a bottom wall of the receiving section 7 provided at the instrument panel 8. The display unit 2 is applied with for example a liquid crystal display device or a vacuum fluorescent display device to output a predetermined display light. The plurality of mirrors 3, 4, 5 is provided at an inner wall of the receiving section 7 and the mirror holder 1 to reflect the display light outputted from the display unit 2 for changing a light path and providing the display light finally to the predetermined eye point E. The mirrors 3, 4 and 5 are total reflection mirrors which are evaporated with reflecting film on a resin or glass. Adhesive sheet is stuck on each rear surface of the mirrors 3, 4, 5 to prevent scatter of broken pieces or exposure of broken surfaces when the mirrors 3, 4, 5 are attacked by a strong shock. Thereby, safety is maintained when the mirrors are attacked by a strong shock by an accident.

The front glass 6 is formed with a flat or slightly curved acrylic sheet having 90% light transmittance for protecting the display unit 2 from dust.

The receiving section 7 is formed by digging the instrument panel 8 downwardly for receiving the mirror holder 1 including the mirror 3, the display unit 2 and the mirrors 4, 5. The receiving section 7 is also provided with the rotation shaft AX of the mirror holder 1. A part of the receiving section 7 is structured by a protecting cover 7*a*. The receiving section 7 is provided at a top wall thereof with an opening 8*a* covered only by the mirror holder 1.

The head-up display apparatus is electric drive type, and includes a driving mechanism having a motor and gears for turning the mirror holder 1 up/down. However, for understanding subject matters of the present invention, description about the driving mechanism is not required and is omitted.

In such structure, the mirror holder 1 is maintained stably in a condition shown in FIG. 1A when it is turned up. In the condition, the display light outputted form the display unit 2 is reflected by the plurality of mirrors 3, 4, 5 for changing the light path to provide it finally to the predetermined eye point E. The condition corresponds to an in-use condition.

In a turn-up condition, when a predetermined switch operation is acted, the mirror holder 1 gradually tilts forwardly around the rotation shaft AX, and finally becomes stable in a turn-down condition as shown in FIG. 1B. The condition corresponds to a not-in-use condition.

In the turn-down condition as shown in FIG. 1B, when a predetermined switch operation is acted, the mirror holder 1 is gradually turned up around the rotation shaft AX, and finally becomes stable in the turn-up condition as shown in FIG. 1A.

In such turn-up condition, a track TR11*a* of a rear cover apex 11*a* of the holder rear cover 11 is designed to be outside a track TR12*a* of a top cover apex 12*a* of the holder top cover 12. In other words, the holder rear cover 11 and the holder top cover 12 are connected so as to have such relation between the track TR11*a* and track TR12*a*. For the above purpose, the holder rear cover 11 and the holder top cover 12 are connected so as to make an angle θ between the holder rear cover 11 and the holder top cover 12 acute, that is smaller than 90 degrees. The angle θ is selected by that the holder top cover overlaps on an upper line UL predetermined based on the upper limit of the eye point E. The reasons will be explained as follows with reference to FIGS. 3A, 3B, 4A, 4B.

Figure 3A:
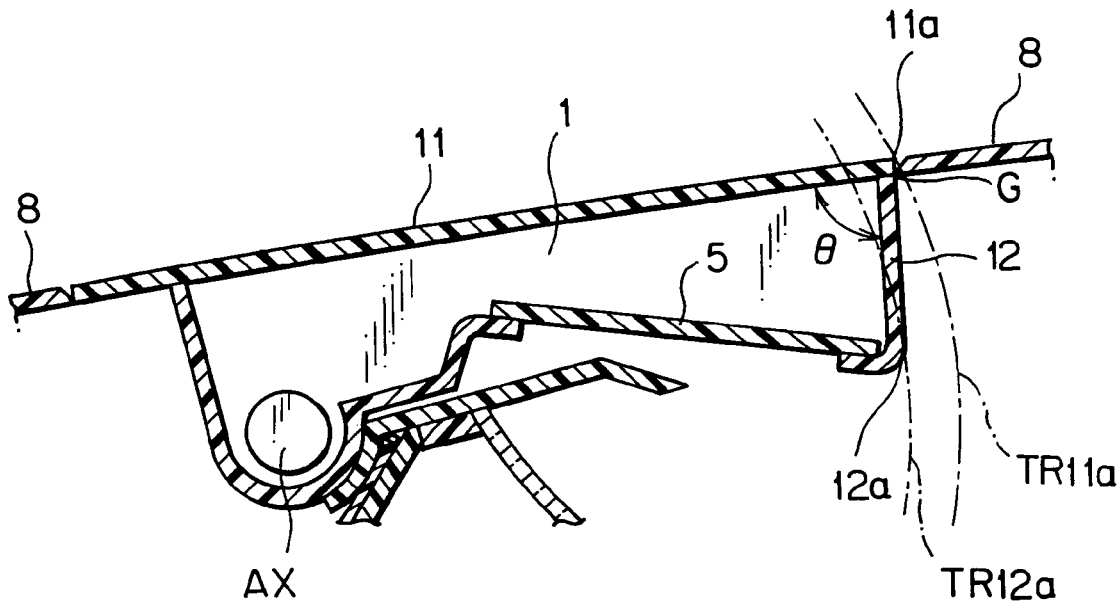
FIG. 3A is an illustration showing a condition that the head-up display apparatus is turned down.
Figure 3B:
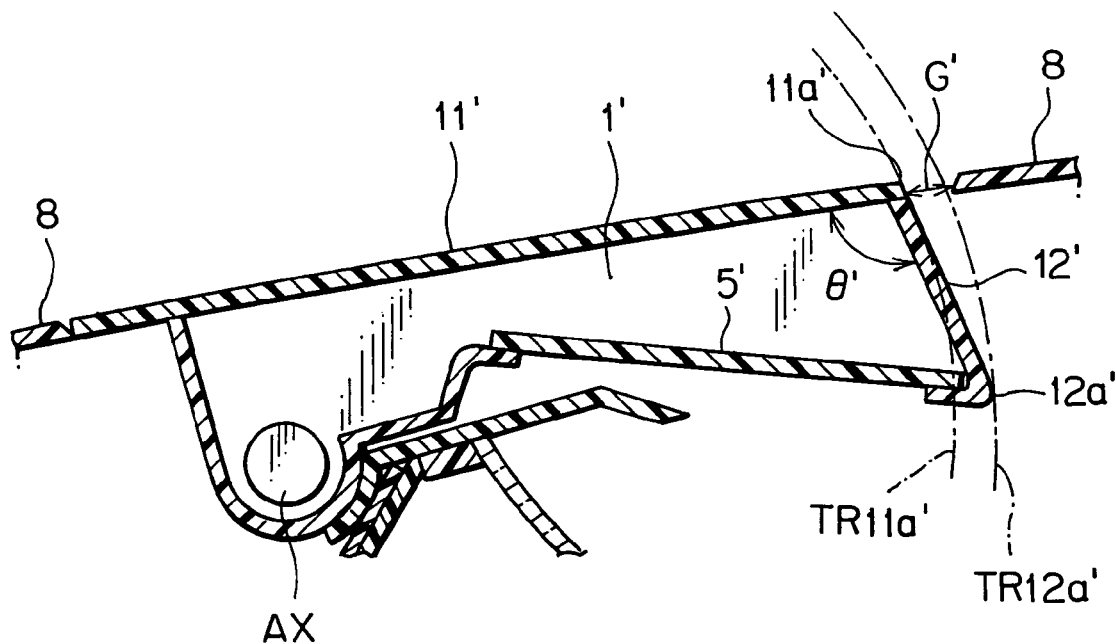
FIG. 3B is an illustration for explaining a condition that the head-up display apparatus is turned down.
Figure 5A:
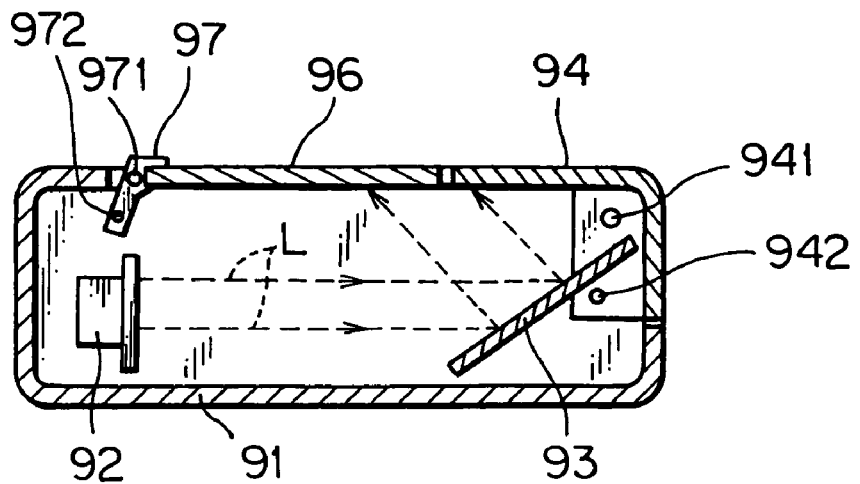
FIG. 5A is an illustration showing a condition that a head-up display apparatus by prior art is turned down.
Figure 5B:
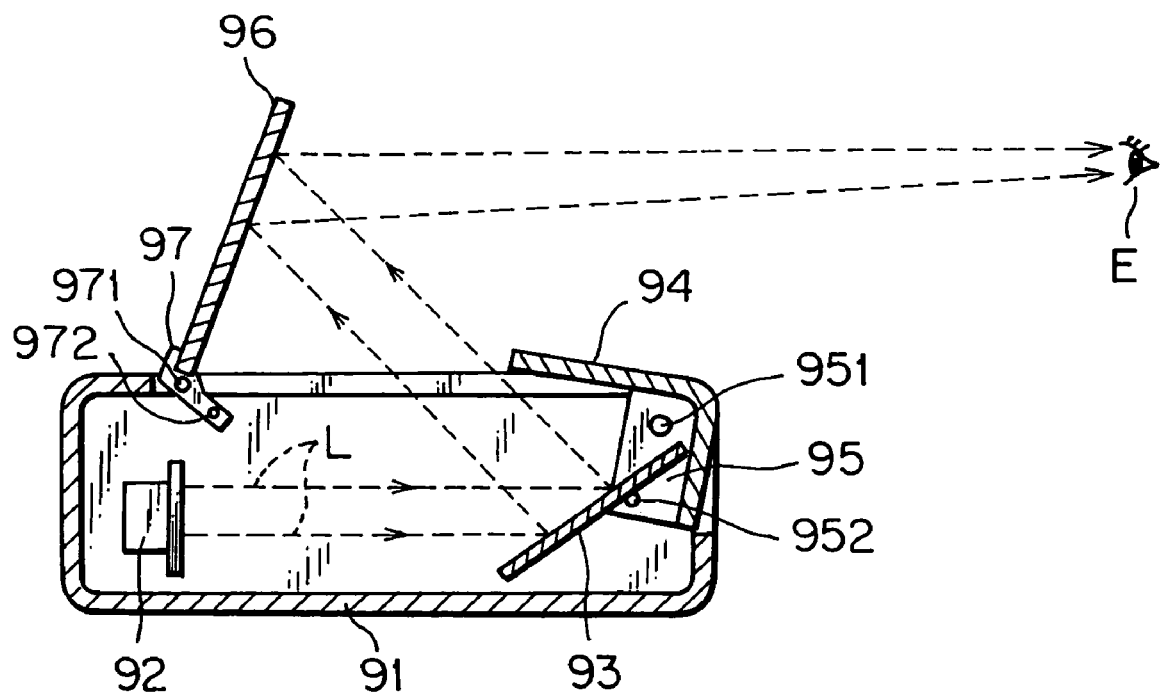
FIG. 5B is an illustration showing a condition that the head-up display apparatus by prior art is turned up.

FIG. 3A is an illustration showing the turn-down condition of the embodiment according to the present invention. FIG. 3B is a reference illustration of the turn-down condition for explaining the embodiment according to the present invention. FIG. 4A is an illustration showing the turn-up condition of the embodiment according to the present invention. FIG. 4B is a reference illustration of the turn-up condition for explaining the embodiment according to the present invention.

As shown the mirror holder 1 in FIG. 3A, when the track TR11*a* of the rear cover apex 11*a* of the holder rear cover 11 is designed to be outside the track TR12*a* of the top cover apex 12*a* of the holder top cover 12, an inner edge of the opening can be designed to match with the rear cover apex 11*a*. Thereby, when the mirror holder 1 is turned down forwardly, the holder rear cover 11 can hide the holder top cover 12.

On the other hand, as shown the mirror holder 1' in FIG. 3B, when the track TR11*a*' of the rear cover apex 11*a*' of the holder rear cover 11' is designed to be inside the track TR12*a*' of the top cover apex 12*a*' of the holder top cover 12', the inner edge of the opening must be designed to match with the top cover apex 12*a*'. Thereby, when the mirror holder 1' is turned down forwardly, the width of the parting line G between the rear cover apex 11*a*' and the inner edge of the opening would become wider.

Physically, the holder rear cover 11 has the surface shape to become in the same outline as that of the instrument panel 8. Thereby, by making an angle θ between the holder rear cover 11 and the holder top cover 12 acute as shown in FIG. 3A, the holder rear cover 11 can hide the holder top cover 12 when the mirror holder 1 is turned down forwardly. Therefore, the width of the parting line G can be narrowed. Furthermore, since the holder rear cover 11 covers totally the opening, the number of parting lines G can be reduced. It makes difficult to see the parting lines G and the appearance can be improved.

If an angle θ between the holder rear cover 11' and the holder top cover 12' is made obtuse as shown in FIG. 3B, the holder rear cover 11' cannot hide the holder top cover 12', the width of the parting line G would become wider when the mirror holder 1' is turned down forwardly.

By maintaining an angle θ between the holder rear cover 11 and the holder top cover 12 acute as shown in FIG. 4A, and designing to overlap the holder top cover 12 on the upper limited line UL predetermined base on the upper limit of the eye point E when the mirror holder 1 is turned up, the appearance can be improved when the mirror holder 1 is turned down forwardly, and also the mirror 5 as large as possible within the limit of the upper limited line UL can be used. Therefore, the appearance can be improved and also better visual recognizability can be maintained.

If an angle θ between the holder rear cover 11' and the holder top cover 12' is made obtuse as shown in FIG. 4B, and the mirror holder 1' is turned up at the same angle as FIG. 4A, the mirror 5' can be increased, but the top edge of the mirror holder 1' is positioned above the upper limited line UL as shown with UL'. Thus, the limit of the upper limited line UL cannot be satisfied, so that it is undesirable for the safety of drive.

As described above, according to the present invention, the number of parting lines can be reduced and the width of the parting line also can be narrowed. Thereby, it makes difficult to see the parting lines so that the appearance can be much improved. By making the holder rear cover with the same material and the same color, the appearance can be more improved. By designing the mirror holder to overlap the holder top cover on the upper limited line predetermined based on the upper limit of the eye point when the mirror holder is turned up, the appearance can be improved and simultaneously the mirror as large as possible can be applied. Therefore, the appearance can be improved and also better visual recognizability can be maintained.

In the above embodiment, the head-up display apparatus includes three mirrors. The present invention can be applied to a head-up display apparatus including at least one mirror.

Although the present invention has been fully described by way of examples with reference to the accompanying drawings, it is to be noted that various change and modifications can be made with the scope of the present invention as defined by the following claims.

What is claimed is:

1. A head-up display apparatus comprising:
   a display unit, to be installed in an opening in an instrument panel of a vehicle, outputting predetermined display light;
   a mirror for reflecting said display light toward a predetermined eye point;

a mirror holder to be turned up/down, being mounted through a shaft on the instrument panel for receiving and holding the mirror;

a holder top cover at a top portion of the mirror holder, extending toward the eye point when the mirror holder turns up; and a holder rear cover at a rear portion of the mirror holder, being continued to, and integrally formed with, the holder top cover so as to be placed at an opposite side of he eye point when the mirror holder is turned up, wherein the holder rear cover has a surface shape to become in a same outline as that of the instrument panel when the holder rear cover covers totally the opening provided at the instrument panel, and hides the holder top cover, when the mirror holder is turned down forwardly, and the holder rear cover is continued to the holder top cover with an acute angle, the holder rear cover alone covering the opening in the panel so as to hide the holder top cover when closed.

2. The head-up display apparatus according to claim 1, wherein said holder rear cover is made of the same material and the same color as that of the instrument panel.

3. The head-up display apparatus according to claim 1 or 2, wherein the mirror holder is turned up so as to overlap the holder top cover on an upper limited line predetermined base on an upper position of the eye point.

* * * * *